United States Patent [19]

Warner et al.

[11] Patent Number: 4,948,024

[45] Date of Patent: Aug. 14, 1990

[54] MOVABLE LOAD PLATFORM FOR A VEHICLE

[76] Inventors: Joseph G. Warner, 33828 Stonewood, Sterling Heights, Mich. 48077; Robert M. Petrovich, 26116 Powers, Dearborn, Mich. 48125

[21] Appl. No.: 381,557

[22] Filed: Jul. 14, 1989

[51] Int. Cl.$^5$ .............................. B60Q 9/042; 414 462; 414 463; 414 466
[52] U.S. Cl. ..................................... 224/310; 224/321; 224/42.21
[58] Field of Search ............ 224/310, 309, 321, 42.13, 224/42.12, 42.21, 42.29

[56] References Cited

U.S. PATENT DOCUMENTS

| | | | |
|---|---|---|---|
| 2,091,071 | 8/1937 | Girl | 414/463 X |
| 3,963,136 | 6/1976 | Spanke | 224/310 X |
| 4,216,887 | 8/1980 | Kieffer | 224/310 |
| 4,871,103 | 10/1989 | Martinsson | 224/310 |

Primary Examiner—Renee S. Luebke
Attorney, Agent, or Firm—Peter A. Taucher; David L. Kuhn

[57] ABSTRACT

Disclosed is a load platform translatable along rails mounted to the exterior of a vehicle, the platform being tiltably mounted upon an axle extending between the rails. Supported on the axle is a manually releasable locking mechanism in which the axle rotates, the locking mechanism acting to maintain the axle and platform in a given translational position along the rails.

11 Claims, 6 Drawing Sheets

MOVABLE LOAD PLATFORM FOR A VEHICLE

GOVERNMENT INTEREST

The invention described herein may be manufactured, used, and licensed by or for the Government for governmental purposes without payment to me of any royalty thereon.

BACKGROUND AND SUMMARY

The U.S. Army currently fields a general purpose vehicle known as the HMMWV having wheel-and-tire assemblies that weigh in excess of 100 pounds. For some applications of the vehicle, it is intended that a spare assembly will be carried on the exterior of the vehicle on a sloped hatchback panel at the rear of the vehicle. The location where the assembly attaches is above shoulder height for a majority of soldiers, and the assembly will therefore be difficult to mount and demount from the vehicle, especially in view of the assembly's weight.

We have devised a load platform translatable along rails on the hatchback area of the vehicle and tiltable on the vehicle. The platform has a first, nearly vertical position below the shoulder height of soldiers where the assembly can relatively easily be attached to the platform. The platform will easily tilt to a position parallel to the hatchback panel and can then be pushed upward on the panel to a third, carrying position, whereupon the platform is locked in place. Rotatable relative to the axle and mounted thereto is a manually releasable locking mechanism for fixing the axle in a given position along the rails.

We believe that our invention can be used on other military vehicles besides the HMMWV, such as tanks and armored personnel carriers. In addition, we believe our invention is adaptable for use on large or small trucks, or on utility vehicles.

DETAILED DESCRIPTION

Figure 1:
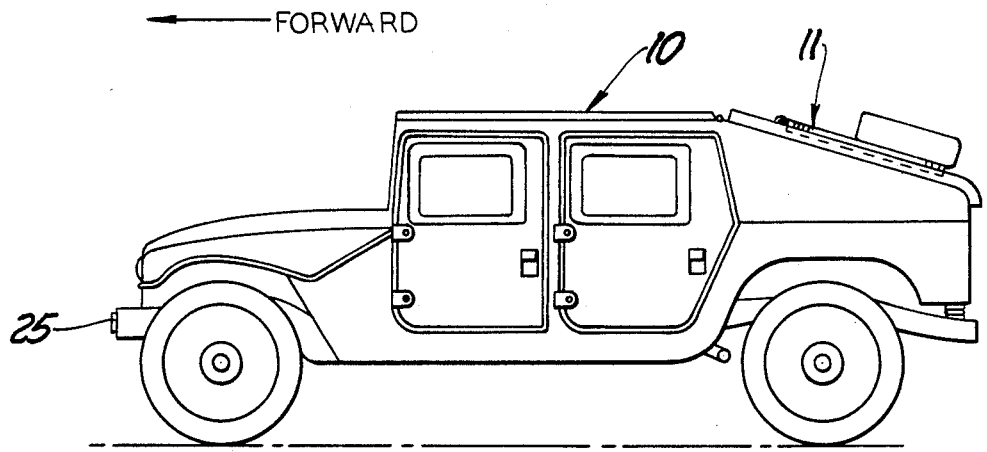
FIG. 1 is a side elevational view of a High Mobility Multipurpose Wheeled Vehicle, or HMMWV, having our movable load platform thereon.
Figure 2:
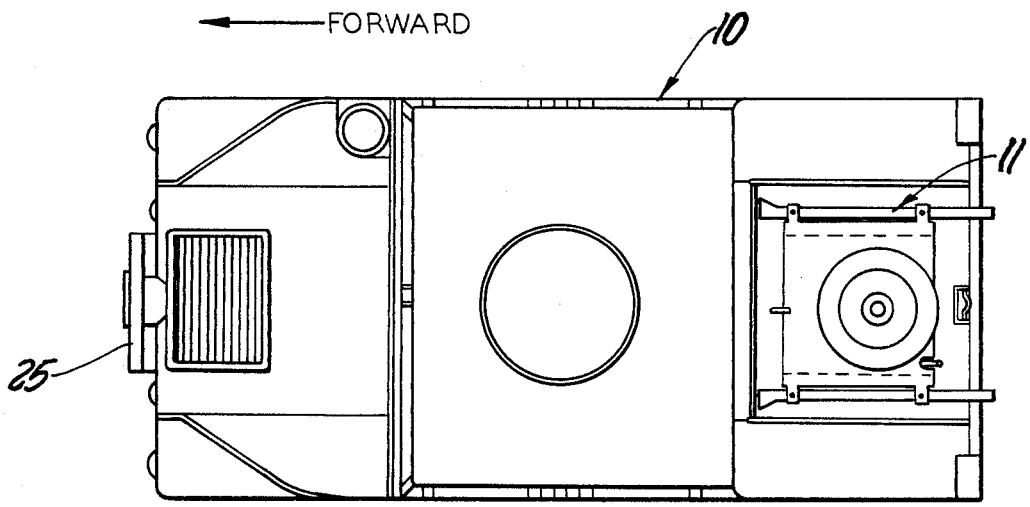
FIG. 2 is a plan view of the vehicle shown in FIG. 1.

FIGS. 1 and 2 show side and top elevational views of the U.S. Army's High Mobility Multipurpose Wheeled Vehicle (HMMWV) 10 with a spare tire carrier 11 mounted thereon. More details of the carrier 11 are shown FIGS. 3 and 4, which are enlarged views of carrier 11 and the portion of vehicle 10 upon which the carrier is mounted.

Figure 3:
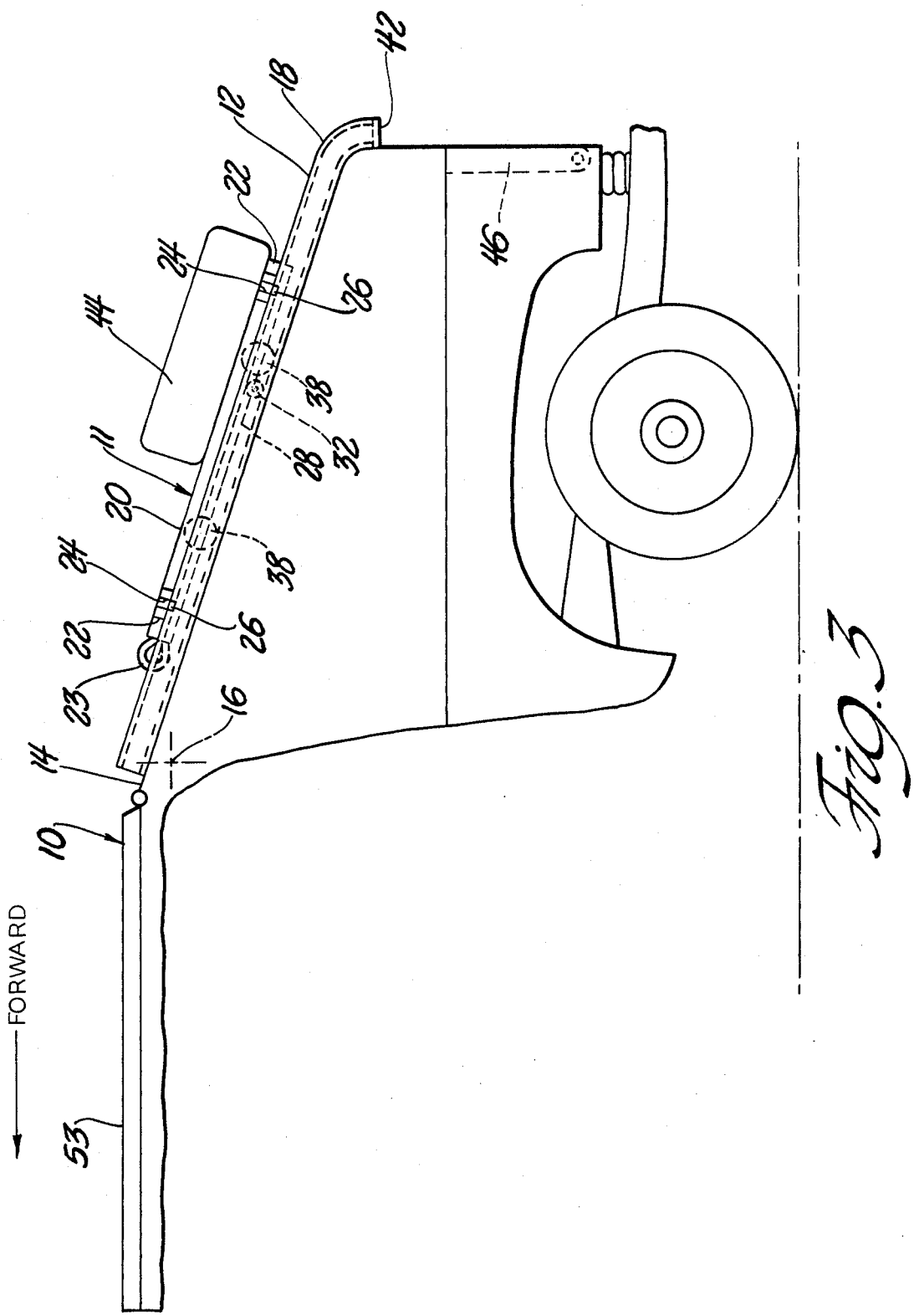
FIG. 3 is an enlarged side elevational view of the hatchback area of the vehicle showing our platform in its normal load-carrying position.
Figure 4:
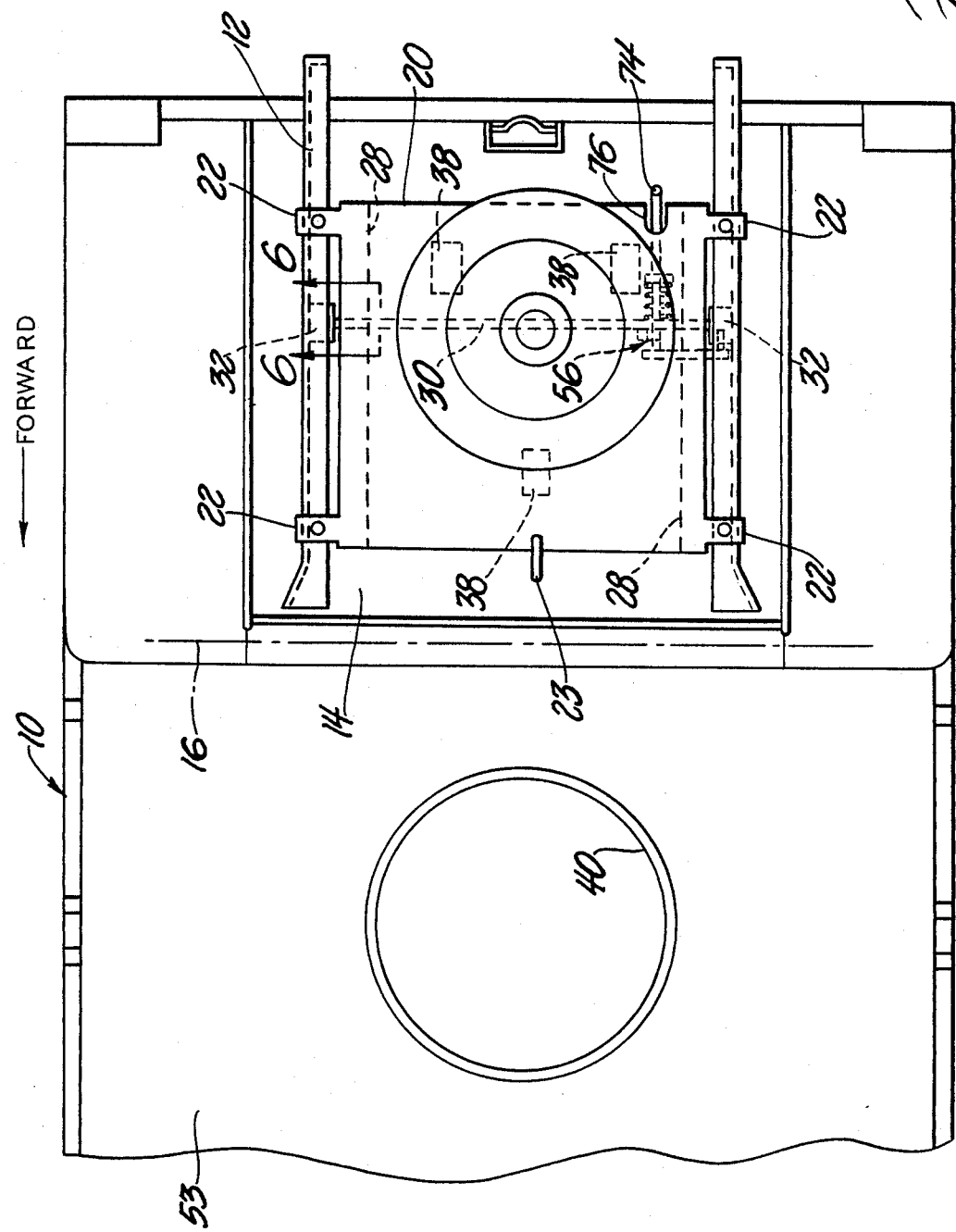
FIG. 4 is an enlarged plan view of the hatchback area of the vehicle showing the platform thereon.

As seen in FIGS. 3 and 4, vehicle 10 has a hatchback door 14 at the rear of the vehicle which swings upward about axis 16 to open. Fastened to door 14 are two parallel guide rails 12 formed as U-shaped channels open toward each other and flared at the forward ends. Mounted to rails 12 is a carriage platform 20 having transverse tabs 22 riding atop the rails, tabs 22 defining apertures 24 registerable with complementary apertures 26 in the top of rail 12. Pins or bolts (not shown) can be inserted into apertures 24 and through the complementary apertures 26 to fix platform 20 to rails 12 at a suitable position along the rails. Additional apertures could be spaced at intervals along the top of rail 12 so that platform 20 could be fixed on the rail at positions forward or rearward of the position shown in FIG. 3. At the forward end of the platform 20 is an eye ring 23 to which a cable (not shown) may be fastened to pull the platform forward and upward on vehicle 10, the pulling power suppliable by a winch (not shown) fixed to the front bumper area 25 (FIGS. 1 and 2) of the vehicle.

Figure 6:
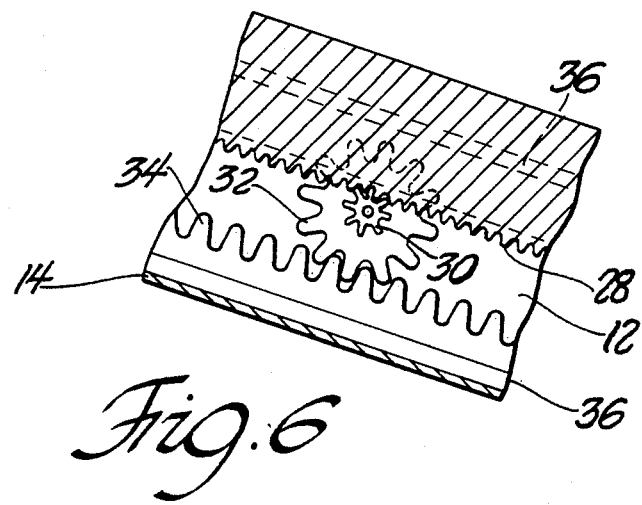
FIG. 6 is a view along lines 6—6 in FIG. 4 and shows a gear wheel engaged to a toothed rack in the rail along which the platform translates.

As best understood by viewing FIG. 6 in conjunction with FIGS. 3 and 4, the underside of platform 20 has longitudinal racks 28 whose teeth project downward toward door 14 to mesh with toothed segments of axle 30. At the ends of axle 30 are geared wheels 32, which fit between upper and lower flanges 36 of rails 12 and which meshingly ride upon rail teeth 34. Optionally mounted to the underside of the platform are a set of free wheeling rollers 38 which bear upon door 14 so that axle 30 does not carry the full weight of platform 20. It may be desired to arrange the wheels in a pattern as in FIG. 4, such that all the wheels can fit into turret opening 40 when platform 20 is placed over the turret opening.

Figure 5:
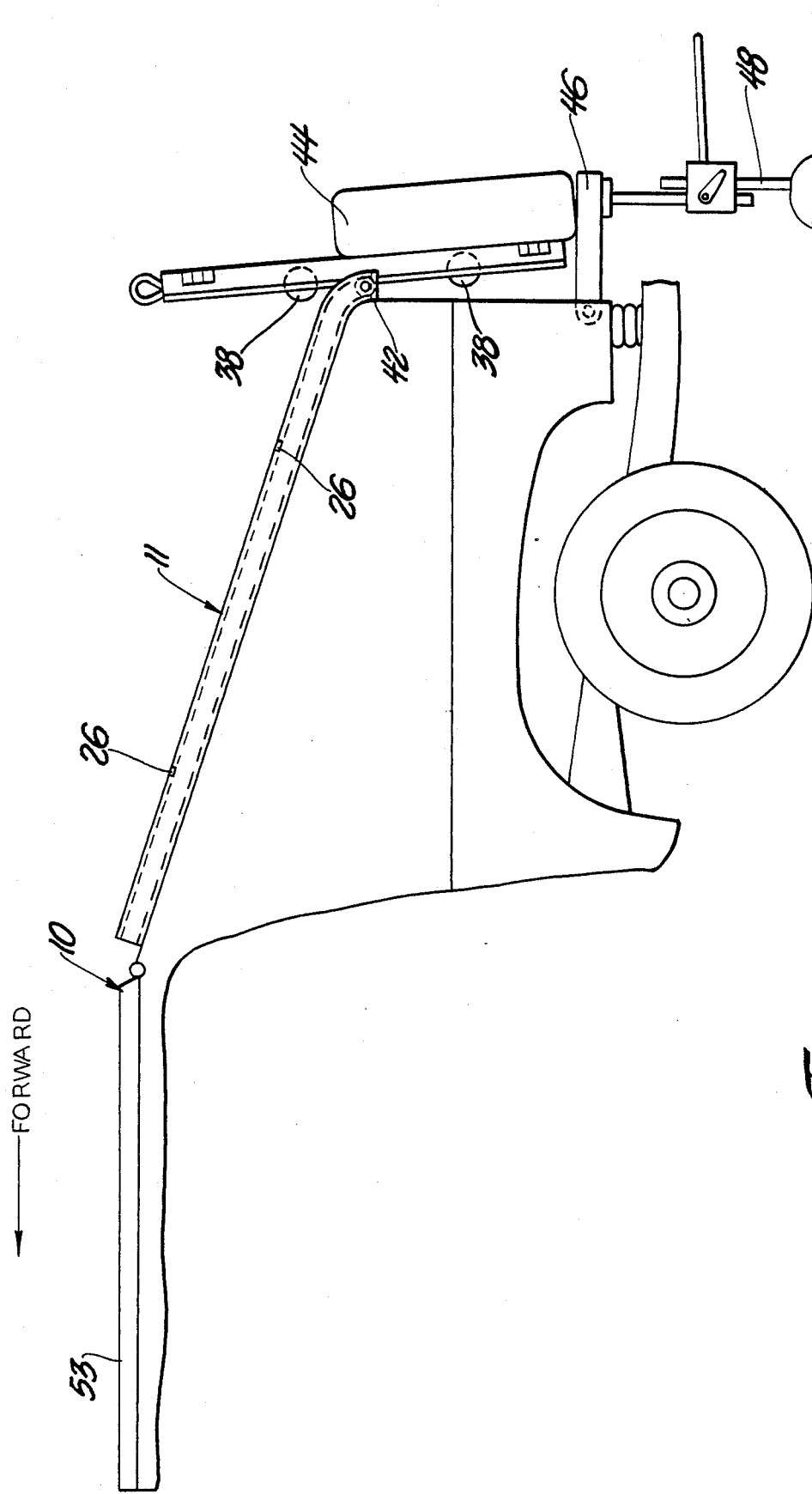
FIG. 5 is another enlarged side elevational view of the hatchback area of the vehicle showing the platform in a position where a tire-and-wheel assembly can be easily mounted to the platform.
Figure 8:
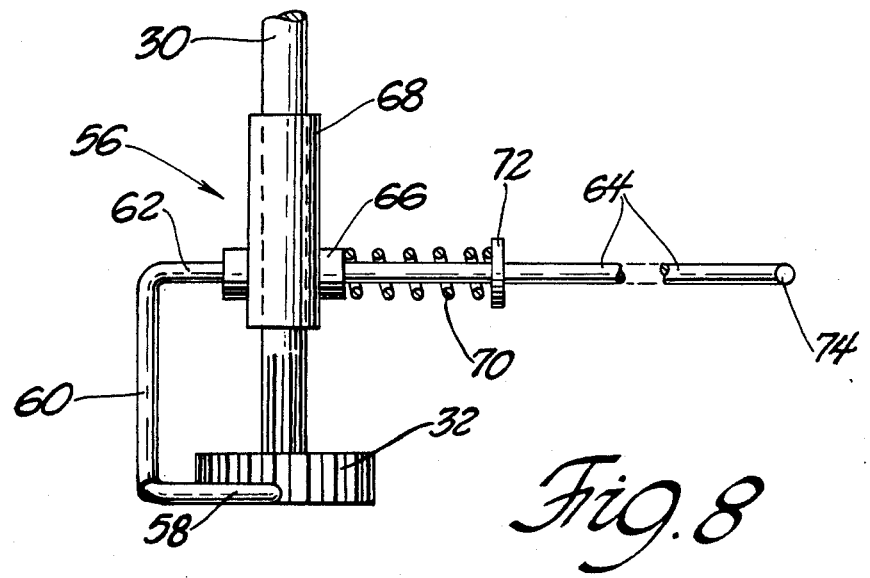
FIG. 8 is a detailed view of a locking mechanism for selectively holding the platform stationary on the rails.
Figure 9:
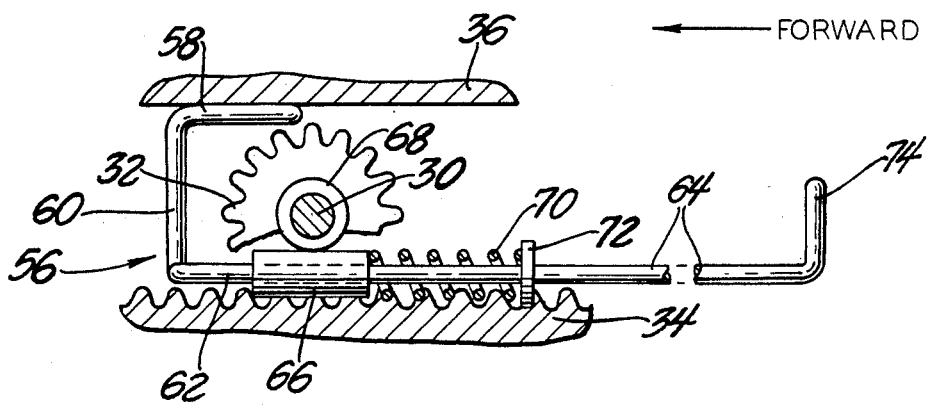
FIG. 9 is another detailed view of the locking mechanism, which shows the juxtaposition between the mechanism and parts of the rails.

Shown in FIG. 4 but omitted from FIGS. 3 and 5 for the sake of clarity is a locking mechanism 56, the details of which are shown in FIGS. 8 and 9. Mechanism 56 has a rearwardly extending finger 58 which can be translated to the right in FIG. 9 to become trapped between the teeth of wheel 32 and upper flange 36 of rail 12, whereby wheel 32 and platform 20 are prevented from moving rearward. Finger 58 is connected by a dual-bend arm 60 to segment 62 of actuator arm 64, which translates through a tube 66 perpendicular to axle 30. Tube 66 is fixed to transverse cylinder 68, which is preferably axially fixed relative to axle 30 but which rotates freely on axle 30. Coil spring 70 is disposed on arm 64 between spring retention collar 72 and the rearward end of tube 66 and acts to bias arm 64 rearward so that finger 58 is biased toward engagement with wheel 32. Extending upwardly from the rearward end of arm 64 is a handle 74, which is manually pushed into slot 76 (FIG. 4) of platform 20 to deactuate mechanism 56 and to thereby release platform 20. Although FIG. 4 shows a locking mechanism only along one rail, a second locking mechanism may be placed along the other rail as well. A human operator who is pushing platform 20 upward and forward does so while grasping handle or handles 74, so the operator automatically releases platform 20 for rolling when he pushes. Simply releasing the handles 74 will cause locking mechanism 56 to reactuate.

When platform 20 is pushed forward, both platform 20 and axle 30 move forward relative to vehicle 10, platform 20 moving forward faster than axle 30. Axle 30 approaches the rear of platform 20 and passes to a point behind the gravitational center of the platform and its load. Conversely, when platform 20 is pushed rearward, both platform 20 and axle 30 move rearward relative to vehicle 10, platform 20 moving rearward faster than axle 30. Axle 30 approaches the front of platform 20 and passes to a point forward of the gravitational center of the platform and its load. In another manner of speaking, the center of gravity of the platform and a load thereon shift forward or rearward relative to axle 30 when the platform moves forward or rearward. Such shifting is guaranteed because of the meshing engagement between rack 28 on platform 20 and the complimentarily toothed section of axle 30. It is preferred that this center of gravity will be rearward of axle 30 when wheels 32 are at or near the rearward ends of rails 20, so that platform 20 will tend to tilt to its FIG. 5 position. It is also preferred that this center of gravity will be forward of axle 30 when wheels 32 are at or near the forward end of rails 12. Platform 20 will then tend to tilt toward a horizontal position wherein the forward section of platform 20 will rest upon roof 53 of vehicle 10.

The advantage of the foregoing arrangement is that it avoids the need for platform 20 to be manually held in place when the platform is locked into a horizontal position. Once the platform is locked into the horizontal position, a load on the platform may remain there on the roof of the vehicle. Another advantage of the foregoing arrangement is that gravity keeps platform 20 in place once the platform has reached its nearly vertical FIG. 5 position. The platform will not need to be latched down or manually held when loading or unloading the platform in this position.

The rearward end of rails 12 extends slightly beyond the face of hatchback door 14. Each rail has a stop 42 at the rearward end to keep axle 30 and wheels 32 from exiting the rails. This arrangement permits platform 20 to be translated rearward from its FIG. 3 position and then to be tilted to the FIG. 5 position, where the spare tire 44 can rest on tailgate 46. Tailgate 46 can be much like a conventional tailgate of a pickup truck, swinging from its vertical position in FIG. 3 to a horizontal position in FIG. 5. Allowing the tire to rest on the tailgate facilitates mounting or demounting the tire to the vehicle, since the weight of the tire is born by the tailgate during such processes and is not born by the human operator who is handling the tire. As seen in FIG. 5, jack assembly 48 may be used to keep tailgate 46 from swinging downward past a horizontal position.

Figure 7:
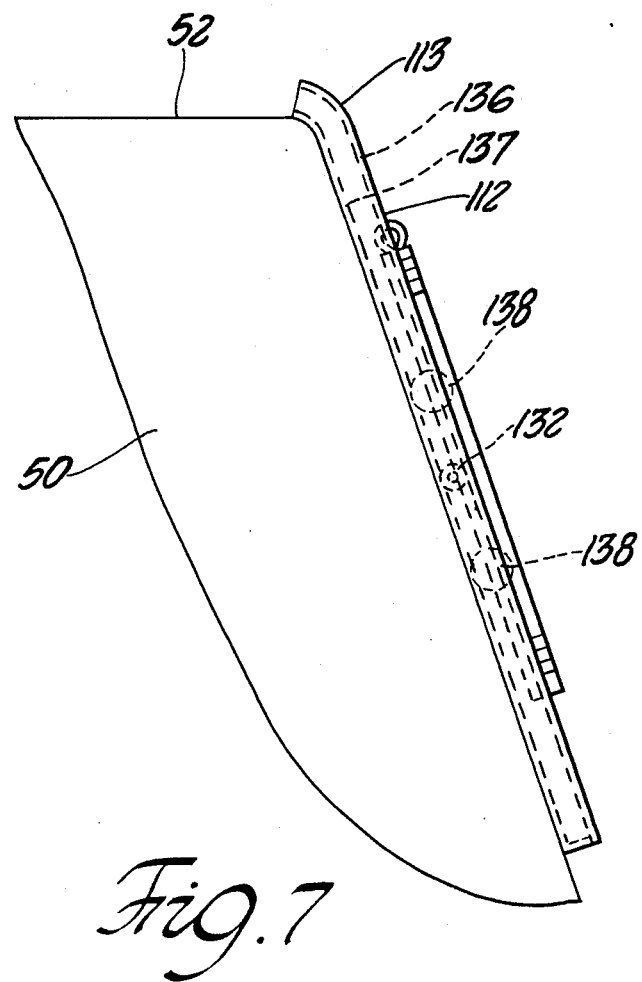
FIG. 7 is an alternate embodiment of the invention.

FIG. 7 shows a second embodiment of our load platform as adapted for use on a steeply sloped surface of tank turret 50. Platform 120 is the same as platform 20 in the previous embodiment but track 112 differs from track 12 because the upper end of track 112 has curved segment 113 extending above top surface 52 of turret 50. Gear wheel 132 on platform 120 is much the same as gear wheel 32 and meshingly rides on teeth of flange 137 of rail 112, which has an opposing flange 136 to keep gear wheel 132 trapped against flange 137. Wheel 132 may be rotatably mounted to an axle (not shown) which is fixedly mounted to the underside of platform 120. Alternatively, wheel 132 may be mounted to an axle such as axle 30, so that gear teeth on the axle engage a rack on platform 120, whereby platform 120 meshes with and rolls upon the axle in the same fashion that platform 20 engages axle 30. Platform 120 can be translated up the side of turret 50 on a pair of parallel rails 112, and then the platform can be tilted to a horizontal position after wheel 132 reaches curved segment 113 of rail 112. Platform 120 can then be rolled along surface 52 upon wheels 138 mounted between the lateral edges of platform 120.

We wish it to be understood that we do not desire to be limited to the exact details of construction shown and described herein since obvious modifications will occur to those skilled in the relevant arts without departing from the spirit and scope of the following claims.

We claim:

1. A load bearing device on a sloped surface of a vehicle, comprising:
   a pair of parallel rails mounted on the sloped surface, the rails each having one end higher on the sloped surface than the other end;
   a platform translatable up and down the sloped surface along the rails;
   a single axle extending transversely of the platform and pivotally supporting the platform, the platform and axle moving relative to one another in a direction along the rails as the platform translates along the rails;
   a wheel on either end of the axle for rolling within channels formed by the rails;
   manually releasable holding means for preventing translation of the platform along the rail, the holding means including a lock mechanism mounted to the axle so that the axle rotates within the holding means, the lock mechanism movable relative to the platform in concert with the axle.

2. The device of claim 1 wherein the platform has a toothed rack on the underside thereof and the axle has a toothed segment meshed with the toothed rack.

3. The device of claim 1 wherein at least one of the rails defines a rail rack within and along the rail, and wherein the wheels have circumferential teeth meshable with the rail rack.

4. The device of claim 1 wherein the sloped surface is a flat surface which boarders upon another flat surface of the vehicle; wherein the rail extends beyond an edge of the sloped surface and the wheel is rollable to the section of the rail extending beyond the sloped surface, whereby the platform is tiltable from a first position substantially parallel to the sloped surface toward a second position parallel to the other flat surface.

5. The spare tire carrier of claim 4 wherein the platform has laterally extending tabs for riding atop the rails, the tabs and tops of the rails defining through holes for accommodating shanks of lock members.

6. The device of claim 1 wherein the lock mechanism includes a finger insertable between one of the wheels and a wall of the channel to prevent rolling of the one wheel in one direction along the channel.

7. The device of claim 6 wherein the lock mechanism includes:
   a cylinder coaxially mounted on the axle so that the axle rotates within the cylinder;
   a tube fixed to the cylinder oriented perpendicular to the cylinder;
   an actuator arm passing through the tube;
   a collar fixed on the actuator arm;
   a spring on the actuator arm;
   an intermediate member rigidly connected to a section of the actuator arm extending from an end of the tube, the member rigidly connected to the finger, the spring acting to bias the finger toward a position where the finger is inserted between the wheel and the wall of the channel.

8. The device of claim 7 wherein a portion of the intermediate member is between the sloped surface and the platform and the intermediate member comprises a transverse rod extending substantially perpendicular to the rail, extending parallel to the sloped surface and disposed in close proximity to the sloped surface, whereby the intermediate member offers minimal interference with tilting of the platform about the axle.

9. A spare tire carrier for a vehicle wherein the vehicle includes a front end and a rearward end, a roof, a tailgate at the rearward end of the vehicle releasably fixable in a horizontal position, and a sloped panel of the vehicle disposed between the roof and the tailgate, the carrier comprising:

a pair of parallel rails fixed to the sloped panel, one end of the rails being near the roof and the other end of the rails being near the tail gate, the rails being formed as cross-sectionally rectangular channels open toward one another, a wall of the channel being flat against the sloped panel;

a toothed rack formed within each channel;

a generally planar platform translatable along the rails, the platform having means for fixing a spare tire thereto so that the rearwardmost portion of the tire extends slightly beyond the rearward edge of the platform;

an underside rack on the platform on a face of the platform oriented toward the sloped panel, the underside rack disposed parallel to the rails;

a gear rollable along each rail in meshed engagement with the toothed rack;

an axle extending between the rails for connecting a first wheel in one rail to a second wheel in another rail, the axle pivotally supporting the platform and having a toothed section for meshing engagement with the underside rack on the platform, so that the platform can meshingly roll on the axle while the wheels meshingly roll in the channels;

the wheels rollable to a position at the other end of the rails so that the platform can be rotated from a position where the platform is essentially parallel to the sloped surface to a position where the platform and the tire simultaneously rest on the tailgate when the tailgate is in its horizontal position.

10. The spare tire carrier of claim 9 wherein the the roof of the vehicle has a turret access hole therein and the platform has rollers rotatably mounted to the platform for rolling contact with the sloped panel, the rollers arrayed in a pattern that will fit into the access hole when the platform is on the roof.

11. The carrier of claim 9 wherein the one end of the rails is open and flared toward the front end of the vehicle and the other end of the rails is closed to block escape of the wheels.

* * * * *